US010522822B2

(12) United States Patent
Story et al.

(10) Patent No.: US 10,522,822 B2
(45) Date of Patent: Dec. 31, 2019

(54) LITHIUM MANGANESE OXIDE COMPOSITIONS

(71) Applicant: EMD ACQUISITION LLC, Henderson, NV (US)

(72) Inventors: Phillip M. Story, Yukon, OK (US); Laurie I. Jegaden, Edmond, OK (US)

(73) Assignee: EMD Acquisition LLC, Henderson, NV (US)

( * ) Notice: Subject to any disclaimer, the term of this patent is extended or adjusted under 35 U.S.C. 154(b) by 610 days.

(21) Appl. No.: 14/762,148

(22) PCT Filed: Feb. 1, 2013

(86) PCT No.: PCT/US2013/024284
§ 371 (c)(1),
(2) Date: Jul. 20, 2015

(87) PCT Pub. No.: WO2014/120238
PCT Pub. Date: Aug. 7, 2014

(65) Prior Publication Data
US 2015/0372293 A1    Dec. 24, 2015

(51) Int. Cl.
*H01M 4/36*       (2006.01)
*H01M 4/04*       (2006.01)
(Continued)

(52) U.S. Cl.
CPC ........ *H01M 4/366* (2013.01); *C01G 45/1242* (2013.01); *H01M 4/0402* (2013.01);
(Continued)

(58) Field of Classification Search
CPC ............. C01G 45/1242; C01P 2002/32; C01P 2002/72; C01P 2004/61; C01P 2006/40;
(Continued)

(56) References Cited

U.S. PATENT DOCUMENTS 5,449,577 A    9/1995  Dahn et al.
5,478,672 A    12/1995 Mitate
(Continued)

FOREIGN PATENT DOCUMENTS

JP    08-264183 A     11/1996
JP    2000012025 A    1/2000
(Continued)

OTHER PUBLICATIONS

L. Croguennec et al.; Synthesis of Li Materials by Different Routes: Is There Fluorine Substitution for Oxygen?; Journal of Electrochemistry 156, 5 (2009) A349-A355.
(Continued)

*Primary Examiner* — Lisa S Park
(74) *Attorney, Agent, or Firm* — McAfee & Taft (57) ABSTRACT

The present disclosure relates to improved LMO composition suitable for use as cathode material in rechargeable lithium ion batteries. The LMO composition may be doped with an additional metal or undoped. The LMO composition carries a surface treatment of LiF that protects the LMO from acid degradation. Cathodes prepared from the improved LMO have improved fade characteristics.

40 Claims, 7 Drawing Sheets

(51) Int. Cl.
*H01M 4/131* (2010.01)
*H01M 4/1391* (2010.01)
*H01M 4/505* (2010.01)
*C01G 45/12* (2006.01)
*H01M 4/525* (2010.01)
*H01M 10/052* (2010.01)
*H01M 4/02* (2006.01)

(52) U.S. Cl.
CPC ......... *H01M 4/0471* (2013.01); *H01M 4/131* (2013.01); *H01M 4/1391* (2013.01); *H01M 4/505* (2013.01); *H01M 4/525* (2013.01); *C01P 2002/32* (2013.01); *C01P 2002/72* (2013.01); *C01P 2004/61* (2013.01); *C01P 2006/40* (2013.01); *H01M 10/052* (2013.01); *H01M 2004/028* (2013.01)

(58) Field of Classification Search
CPC ........... H01M 4/525; H01M 2004/028; H01M 4/0402; H01M 4/0471; H01M 4/131; H01M 4/1391; H01M 4/366; H01M 4/505; H01M 10/052
See application file for complete search history.

(56) References Cited

U.S. PATENT DOCUMENTS

| | | | |
|---|---|---|---|
| 5,547,782 A | 8/1996 | Dasgupta et al. | |
| 5,558,959 A | 9/1996 | Venugopal et al. | |
| 5,618,640 A | 4/1997 | Idota et al. | |
| 5,639,438 A | 6/1997 | Ellgen | |
| 5,674,645 A | 10/1997 | Amatucci et al. | |
| 5,712,059 A | 1/1998 | Barker et al. | |
| 5,759,720 A | 6/1998 | Amatucci | |
| 5,763,120 A | 6/1998 | Saidi et al. | |
| 5,780,181 A | 7/1998 | Idota et al. | |
| 5,783,328 A | 7/1998 | Wang | |
| 5,846,673 A | 12/1998 | Saidi et al. | |
| 5,869,207 A | 2/1999 | Saidi et al. | |
| 5,900,385 A | 5/1999 | Dahn et al. | |
| 5,928,812 A | 7/1999 | Xue | |
| 5,965,293 A | 7/1999 | Xue | |
| 5,985,237 A | 11/1999 | Lu et al. | |
| 6,019,803 A | 2/2000 | Oskam et al. | |
| 6,087,042 A | 6/2000 | Sugiyama et al. | |
| 6,153,332 A | 11/2000 | Nishida et al. | |
| 6,171,726 B1 | 1/2001 | Reichman et al. | |
| 6,180,282 B1 | 1/2001 | Nishida et al. | |
| 6,183,718 B1 | 2/2001 | Barker et al. | |
| 6,183,911 B1 | 2/2001 | Kweon et al. | |
| 6,268,085 B1 | 7/2001 | Manthiram et al. | |
| 6,274,273 B1* | 8/2001 | Cho | C01G 45/1242 252/182.1 |
| 6,395,431 B1 | 5/2002 | Gao et al. | |
| 6,416,902 B1 | 7/2002 | Miyasaka | |
| 6,468,692 B1 | 10/2002 | Nemoto et al. | |
| 6,491,019 B1 | 12/2002 | Apel | |
| 6,528,033 B1 | 3/2003 | Barker et al. | |
| 6,531,220 B1 | 3/2003 | Kweon | |
| 6,555,026 B1 | 4/2003 | Barker et al. | |
| 6,613,479 B2 | 9/2003 | Fukuzawa et al. | |
| 6,653,021 B2 | 11/2003 | Kweon | |
| 6,670,078 B1 | 12/2003 | Sato et al. | |
| 6,673,491 B2 | 1/2004 | Shirakawa et al. | |
| 6,699,618 B2 | 3/2004 | Noda et al. | |
| 6,713,039 B2 | 3/2004 | Tabata et al. | |
| 6,716,372 B2 | 4/2004 | Barker et al. | |
| 6,723,435 B1 | 4/2004 | Horne et al. | |
| 6,723,470 B2 | 4/2004 | Barker et al. | |
| 6,753,111 B2 | 6/2004 | Kweon et al. | |
| 6,835,492 B2 | 12/2004 | Chung-kun et al. | |
| 6,869,547 B2 | 3/2005 | Barker et al. | |
| 6,872,491 B2 | 3/2005 | Kanai et al. | |
| 6,883,494 B2 | 4/2005 | Kurita et al. | |
| 6,884,544 B2 | 4/2005 | Barker et al. | |
| 6,886,806 B2 | 5/2005 | Borasch et al. | |
| 6,890,456 B2 | 5/2005 | Noda et al. | |
| 6,890,686 B1 | 5/2005 | Barker | |
| 6,924,064 B2 | 8/2005 | Kondo et al. | |
| 6,926,992 B2 | 8/2005 | Isozaki et al. | |
| 6,942,948 B2 | 9/2005 | Takehara et al. | |
| 6,960,331 B2 | 11/2005 | Barker et al. | |
| 6,960,335 B1 | 11/2005 | Singhal et al. | |
| 7,001,690 B2 | 2/2006 | Barker et al. | |
| 7,026,072 B2 | 4/2006 | Barker et al. | |
| 7,041,239 B2 | 5/2006 | Barker et al. | |
| 7,083,878 B2 | 8/2006 | Kotato et al. | |
| 7,090,822 B2 | 8/2006 | Noda et al. | |
| 7,211,325 B2 | 5/2007 | Villalobos et al. | |
| 7,238,451 B2 | 7/2007 | Frech et al. | |
| 7,314,682 B2 | 1/2008 | Thackeray et al. | |
| 7,318,981 B2 | 1/2008 | Iwasa et al. | |
| 7,341,805 B2 | 3/2008 | Ueda et al. | |
| 7,371,338 B2 | 5/2008 | Amatucci | |
| 7,402,360 B2 | 7/2008 | Imachi et al. | |
| 7,429,434 B2 | 9/2008 | Mihara et al. | |
| 7,438,992 B2 | 10/2008 | Barker et al. | |
| 7,491,431 B2 | 2/2009 | Chiruvolu et al. | |
| 7,585,592 B2 | 9/2009 | Kitao et al. | |
| 7,615,314 B2 | 11/2009 | Kawakami et al. | |
| 7,713,313 B1 | 5/2010 | Smith et al. | |
| 7,718,319 B2 | 5/2010 | Manthirum et al. | |
| 7,732,096 B2 | 6/2010 | Thackeray et al. | |
| 7,771,863 B2 | 8/2010 | Mitani et al. | |
| 8,877,377 B2 | 11/2014 | Hosoya | |
| 2002/0122984 A1* | 9/2002 | Sakai | C01G 37/006 429/231.1 |
| 2004/0115117 A1* | 6/2004 | Takei | H01M 4/133 423/448 |
| 2004/0119041 A1 | 6/2004 | Kawai et al. | |
| 2004/0179993 A1* | 9/2004 | Dahn | C01G 53/006 423/594.4 |
| 2004/0191633 A1 | 9/2004 | Johnson et al. | |
| 2005/0067077 A1 | 3/2005 | Chounet et al. | |
| 2005/0136329 A1 | 6/2005 | Howard, Jr. et al. | |
| 2005/0238957 A1* | 10/2005 | Kim | H01M 4/0404 429/212 |
| 2006/0154146 A1 | 3/2006 | Kawasato et al. | |
| 2007/0202411 A1 | 8/2007 | Kim et al. | |
| 2008/0157027 A1 | 7/2008 | Manthiram et al. | |
| 2008/0274408 A1* | 11/2008 | Jarvis | H01M 4/133 429/231.95 |
| 2009/0081529 A1 | 3/2009 | Thackeray et al. | |
| 2009/0087362 A1 | 4/2009 | Sun et al. | |
| 2009/0104532 A1* | 4/2009 | Hosoya | H01M 4/366 429/224 |
| 2009/0253042 A1* | 10/2009 | Sun | H01M 4/136 429/231.95 |
| 2009/0272939 A1 | 11/2009 | Sun et al. | |
| 2009/0286157 A1 | 11/2009 | Chen et al. | |
| 2009/0297947 A1 | 12/2009 | Deng et al. | |
| 2010/0009268 A1 | 1/2010 | Hitomi et al. | |
| 2010/0062339 A1 | 3/2010 | Pan et al. | |
| 2010/0086854 A1 | 4/2010 | Kumar et al. | |
| 2011/0111298 A1 | 5/2011 | Lopez et al. | |
| 2011/0269015 A1* | 11/2011 | Cho | H01M 4/131 429/213 |
| 2011/0311437 A1* | 12/2011 | Yura | C01D 15/02 423/599 |
| 2012/0270104 A1 | 10/2012 | Paulsen et al. | |
| 2013/0071745 A1* | 3/2013 | Mun | H01M 4/1315 429/219 |

FOREIGN PATENT DOCUMENTS

| | | |
|---|---|---|
| JP | 200113446 A2 | 2/2001 |
| JP | 2004193052 A | 7/2004 |
| JP | 2005-158401 | 6/2005 |
| JP | 2006109930 A1 | 10/2006 |
| JP | 2007516583 A | 6/2007 |
| JP | 2007-529874 | 10/2007 |
| JP | 2008-010234 | 1/2008 |

(56) References Cited

FOREIGN PATENT DOCUMENTS

| | | |
|---|---|---|
| JP | 2008536285 A | 9/2008 |
| JP | 2009104805 A | 5/2009 |
| JP | 2012176903 A1 | 12/2012 |
| JP | 2016-507878 | 3/2016 |
| KR | 1003542240000 B1 | 9/2002 |
| WO | 200113446 A2 | 2/2001 |
| WO | 2005067077 A2 | 7/2005 |
| WO | 2006109930 A1 | 10/2006 |
| WO | 2012176903 A1 | 12/2012 |

OTHER PUBLICATIONS

Studies on Capacity Fade of Spinel-Based Li-Ion Batteries, Ramadass et al., Journal of Electrochemical Society 149 (1) A54-A60 (2002).

Mathmatical Modeling of the Capacity Fade of Li-ion Cells, Ramadass et al., Journal of Power Sources 123 (2003).

Croguennec et al., Synthesis of "Li1.1(Nio.425Mn0.425Co0.15)0. 9O1.8F0.2" materials by different routes; is there fluorine substitution for oxygen? Journal of the Electrochemistry 156, 5 (2009) A349-A355, Mar. 18, 2009 (Mar. 18, 2009), entire document.

Office Action and Translation of "Notice of Reasons for Rejection", Patent Application No. JP-2015-555981 dated Jan. 10, 2017.

First Office Action of Patent Application CN2013800720631 dated May 18, 2016.

Second Office Action of Patent Application CN2013800720631 dated Jan. 16, 2017.

EP Search Report and Written Opinion dated Aug. 22, 2016 filed in related application EP2951129.

CA Search Report and Written Opinion dated Nov. 2, 2016 filed in related application CA2899125.

International Search Report and Written Opinion of the International Searching Authority dated Apr. 9, 2013 filed in related application PCT/US13/24284.

Office Action and Translation of "Notice of Reasons for Rejection", Patent Application No. JP 2017-242481 dated Aug. 28, 2018.

Office Action and Translation of "Notice of Reasons for Rejection", Patent Application No. JP 2015-555981 dated Nov. 6, 2018.

European Search Report dated Mar. 15, 2019 filed in related application EP 13873744.0.

\* cited by examiner

LITHIUM MANGANESE OXIDE COMPOSITIONS

CROSS RELATED

This application claims the benefit of previously filed International Application PCT/US2013/024284 filed Feb. 1, 2013.

BACKGROUND

Lithium-ion batteries continue to dominate the rechargeable battery market. Found in nearly every type of handheld rechargeable phone, music player and many other devices, secondary batteries relying upon lithium metal oxides as the cathode composition eventually experience fade and loss of capacity. Capacity loss increases over the life of the battery necessitating recharging of the battery more frequently.

One well-known mechanism responsible for degradation of the cathode material results from the reaction of electrolyte material with water to form hydrofluoric acid. For example, electrolytes such as $LiPF_6$ react with water to form HF according to the following equation:

$$2LiPF_6 + 6H_2O \rightarrow Li_2O + P_2O_5 + 12HF.$$

The resulting HF attacks the metal oxides of the cathode. For example, when using a spinel material such as $LiMn_2O_4$ (also written as $LiMn^{3+}Mn^{4+}O_4$) as the cathode material, the spinel reacts with HF as represented by the following equation:

$$4H^+ + 2LiMn^{3+}Mn^{4+}O_4 \rightarrow 3\lambda MnO_2 + Mn^{2+} + 2Li^+ + 2H_2O.$$

Since this reaction generates water and in turn additional HF, over time the reaction will completely degrade the cathode material. As the reaction progresses, the manganese ion passes through the separator and becomes part of the solid electrolyte interface (SEI layer) at the anode. The addition of the manganese ions to the SEI layer inhibits the flow of ions contributing to the loss of capacity by the cell.

Other common electrolytes including $LiAsF_6$, and $LiBF_4$, and LiTFSI (lithium bis-trifluoromethanesulfonimide) will also produce HF. Further, alternative cathode materials utilizing first row transition metals such as Co, Mn, Ni, Fe and V (possibly doped with other elements) are equally susceptible to degradation by HF. Accordingly, the ability to shield the cathode material from HF attack without detrimentally reducing battery performance will be commercially advantageous.

SUMMARY

In one embodiment, the present invention provides a cathode composition. The cathode composition includes a lithium metal oxide suitable for use in lithium ion batteries. The lithium metal oxide carries a lithium fluoride surface treatment sufficient to substantially preclude degradation of the lithium metal oxide by acids.

In another embodiment, the present invention provides a cathode composition prepared from a lithium metal oxide (LMO) spinel material having the general formula of $Li_{1+x}M_yMn_{2-x-y}O_4$ where $0<x\leq0.25$, $0<y\leq0.5$ and M is one or more trivalent metals from the group Al, Cr, Ga, In and Sc. Alternatively, the cathode composition is prepared from a layered material $Li[Li_{(1-2x)/3}M_yMn_{(2-x)/3}Ni_{x-y}]O_2$ where $0<x<0.5$, $0<y\leq0.25$, $x>y$ and M is one or more metals chosen from Ca, Cu, Mg and Zn. When used as the cathode active material both materials carry a lithium fluoride surface treatment sufficient to substantially preclude degradation of the lithium metal oxide by acids. The resulting cathode active material has improved fade over multiple cycles while maintaining the desired capacity.

Additionally, the present invention provides a method for preparing cathode material. The method includes the steps of dry blending lithium metal oxide with lithium fluoride (LiF) particles followed by heating the resulting dry blend at a temperature and for a period of time sufficient to activate the LiF as a surface treatment on the lithium metal oxide, i.e. the LiF is carried by the lithium metal oxide in a manner to provide the desired protection.

Further, the present invention provides a method for preparing a cathode material suitable for use in a lithium ion battery. The method includes the steps of dry blending a cathode active material having the general formula of $Li_{1+x}M_yMn_{2-x-y}O_4$ where $0<x\leq0.25$, $0<y\leq0.5$ and M is one or more trivalent metals from the group Al, Cr, Ga, In and Sc or $Li[Li_{(1-2x)/3}M_yMn_{(2-x)/3}Ni_{x-y}]O_2$ where $0<x<0.5$, $0<y\leq0.25$, $x>y$ and M is one or more metals chosen from Ca, Cu, Mg and Zn with lithium fluoride (LiF) particles followed by heating the resulting dry blend at a temperature and for a period of time sufficient to activate the LiF as a surface treatment on the lithium metal oxide. The dry blending step utilizes a sufficient amount of LiF such that the resulting blend has from about 0.25 to about 2.5% by weight LiF. Typically, the dry blending step occurs at a temperature between about 10° C. and 30° C. The resulting dry blend material is heated to a temperature between about 700° C. to about 850° C. to provide a final composition in the form of a cathode active material carrying a surface treatment of LiF. Using the resulting cathode active material provides a cathode having a capacity of at least and more preferably greater than 100 mAh/g (milliAmpHour/gram) after 200 cycles.

Still further, the present invention provides an alternative method for preparing lithium manganese oxide compounds suitable for use as cathode material. This method includes the steps of:

selecting a cathode active material having the general formula of $Li_{1+x}M_yMn_{2-x-y}O_4$ where $0<x\leq0.25$, $0<y\leq0.5$ and M is one or more trivalent metals from the group Al, Cr, Ga, In and Sc or $Li[Li_{(1-2x)/3}M_yMn_{(2-x)/3}Ni_{x-y}]O_2$ where $0<x<0.5$, $0<y\leq0.25$, $x>y$ and M is one or more metals chosen from Ca, Cu, Mg and Zn;

preparing a slurry of with LiF particles in water;

heating the slurry to a temperature between about 40° C. and 60° C.;

blending the selected cathode active material into the slurry;

stirring the slurry of LiF and cathode active until the slurry is a homogeneous dispersion;

removing water from the slurry by a drying process;

heating the resulting solids to a temperature between about 450° and 850° for a period sufficient to activate the LiF;

providing a final composition in the form of a cathode active carrying a surface treatment of LiF.

DETAILED DESCRIPTION

The present invention provides a lithium metal oxide composition particularly suited for use as cathode material in a lithium ion battery. The particles of lithium metal oxide (LMO) carry a surface treatment of lithium fluoride. Although the lithium fluoride is not a battery active material, the presence of the LiF on the surface of the LMO particle is believed to shield the metal component from acidic digestion. Since the LiF does not contribute to capacity, the preferred embodiment will use only that amount necessary to protect the LMO from acidic digestion without detrimentally impacting capacity.

Generally, the surface treatment of LiF will not completely encapsulate the LMO particle. Rather, without intending to be limited by theory, we believe the LiF isolates a sufficient portion of the exposed manganese sites on the surface of LMO from the electrolyte thereby limiting the oxidation reaction known to degrade the LMO without interfering with the electrolytic reaction. Expressed on a percent by weight basis, the LiF component of the final LMO particle is between about 0.25% to about 2.0% by weight of the LMO/LiF particle inclusive of LMO material containing a doping metal.

As known to those skilled in the art, the addition of doping metals to LMO stabilizes the cathode active structure during charge/discharge cycles by replacing a portion of the manganese ions within the cathode active material structure. Thus, the addition of the doping metal does not generally change the LMO particle size. Further, the doping metal does not normally contribute to the capacity of the cathode material under typical lithium ion battery operational conditions. Commonly, LMO can have from about 0.1% to about 15% doping metal by weight. More typically, LMO will have from about 0.5% to about 5% doping metal by weight. Therefore, reducing the concentration of doping metal will enhance battery capacity and reduce manufacturing costs.

LMO suitable for use as the base particle includes, but is not necessarily limited to, spinel material having the general formula of:

$$Li_{1+x}M_yMn_{2-x-y}O_4$$

where $0<x\leq0.25$, $0<y\leq0.5$ and M is one or more trivalent metals from the group Al, Cr, Ga, In and Sc or a layered LMO having the general formula of:

$$Li[Li_{(1-2x)/3}M_yMn_{(2-x)/3}Ni_{x-y}]O_2$$

where $0<x<0.5$, $0<y\leq0.25$, $x>y$ and M is one or more metals chosen from Ca, Cu, Mg and Zn.

Figure 1A:
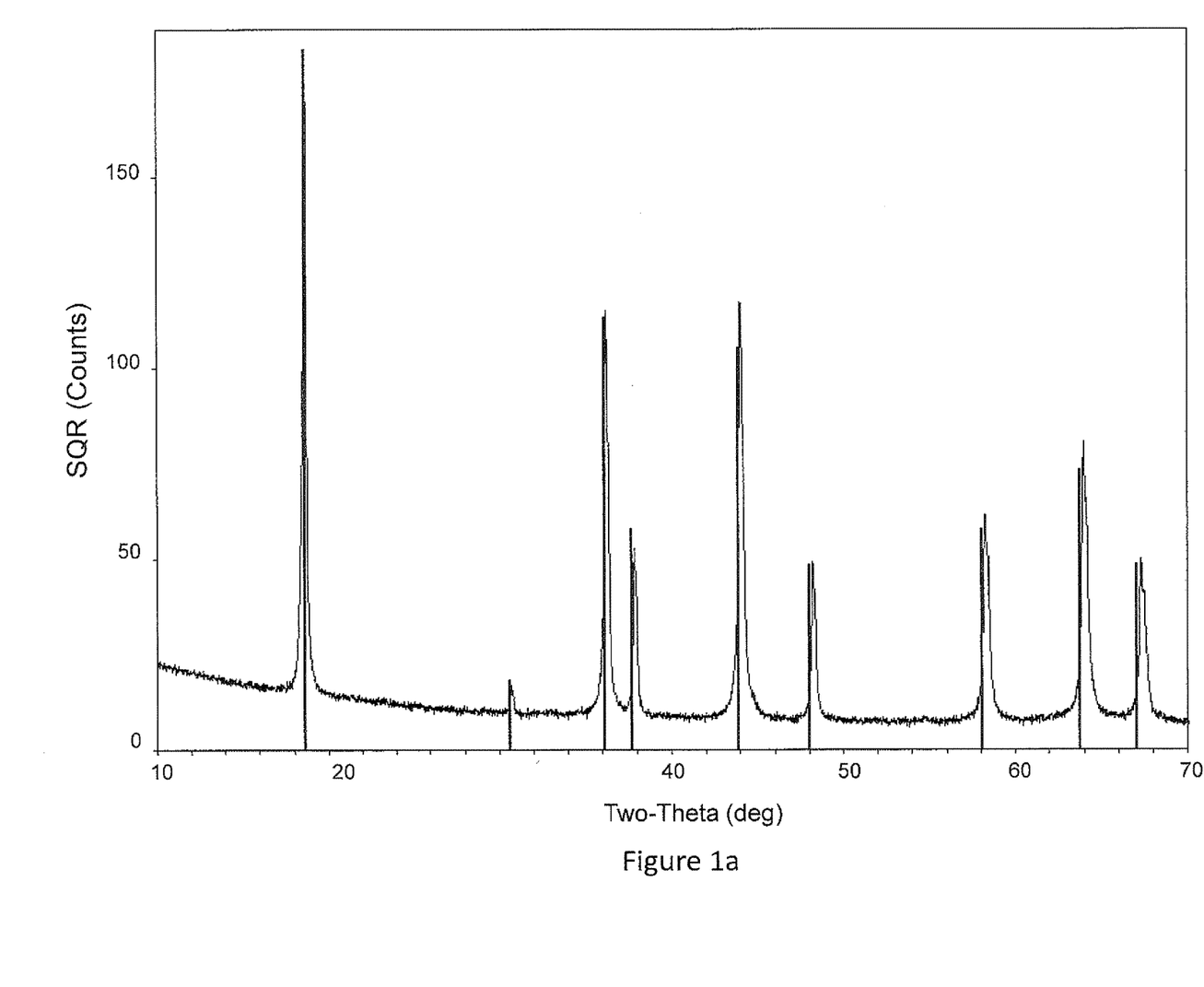
FIG. 1a is an X-Ray Diffraction scan of $LiMn_2O_4$ without a surface treatment of lithium fluoride.
Figure 1B:
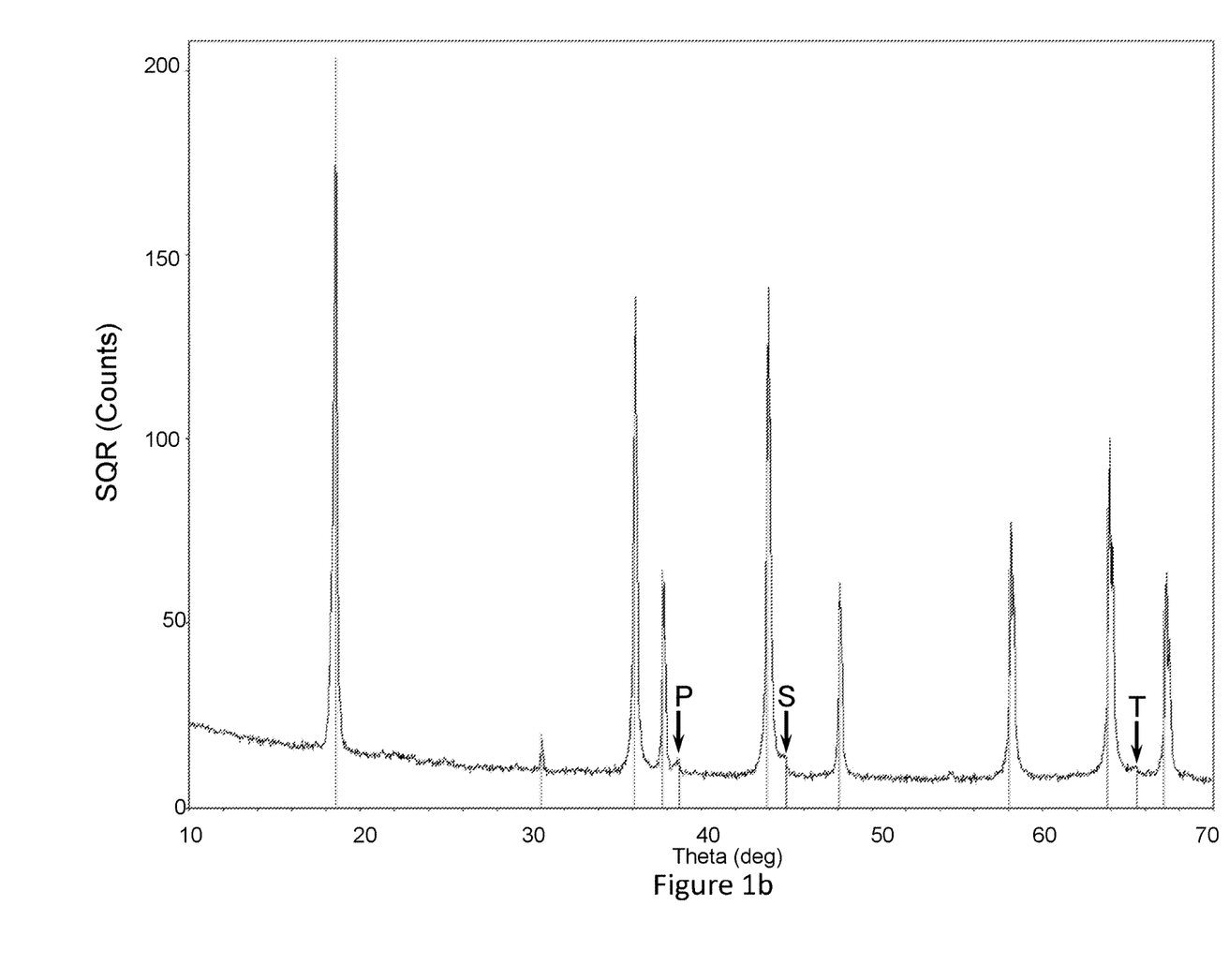
FIG. 1b is an X-Ray Diffraction scan of $LiMn_2O_4$ carrying a surface treatment of lithium fluoride.

For the following discussion all particles sizes refer to median particle size as determined by laser granulometry. In general, prior to blending with LiF, the LMO with or without doping metal, will have particle sizes of about 10 microns or less. More commonly, prior to blending with LiF the LMO, with or without doping metal, will have particle sizes ranging from 3 to about 10 microns. The LMO particle with a surface treatment of LiF has a cubic crystalline structure. Thus, neither the surface treatment of LiF nor the method of adding a surface treatment of LiF to the cathode active material alters the crystalline structure of the LMO. Further, the surface treatment of LiF does not form a "layered" LMO as that term is used by those skilled in the art. As reflected in FIG. 1b, the LMO carrying a surface treatment has x-ray diffraction peaks identified by letters P, S and T at 38.6°, 44.84° and 65.46° 2Θ respectively, (Cu Kα radiation) whereas x-ray diffraction scan of FIG. 1a of the untreated LMO does not have the corresponding peaks.

Preferred LMO cathode active material compositions suitable for carrying the LiF surface treatment include: $Li_{1.06}Al_{0.18}Mn_{1.76}O_4$; $Li_{1.06}Mn_{1.94}O_4$; $Li_{1.06}Cr_{0.1}Mn_{1.4}O_4$; $Li_{1.06}Al_{0.12}Mn_{1.83}O_4$; $Li_{1.07}Mn_{1.93}O_4$ and $LiNi_{0.5}Mn_{1.5}O_4$. As discussed each compound may be doped with a metal selected from the following group: Mg, Al, Cr, Fe, Ni, Co, Ga, In, Sc, In, Cu or Zn. Use of a doping metal helps to stabilize the structure of the cathode active material during discharge/recharge cycles. The doping metal is generally not a battery active material. Therefore, use of doping metal reduces the overall capacity per gram of the cathode material. Incorporation of the LiF surface treatment will reduce the requirements for doping metal thereby improving capacity of the final cathode material. In general, a cathode material having a LiF surface treatment will require about 50% less doping material than a cathode material lacking LiF surface treatment. Commonly, cathode materials with the LiF surface treatment will have from about 0.5% to about 2.0% by weight doping material. Typically, the cathode material will have a capacity of 105 mAH/g to 120 mAH/g.

As discussed in more detail below, the LMO with surface treatment of LiF is particularly suited for use as a cathode material in lithium ion batteries.

Preparation of the LMO carrying a surface treatment of LiF may use one of two new methods. Both methods advantageously utilize a neutral salt, thereby eliminating handling problems associated with hydrofluoric acid. The preferred method dry blends the components followed by heating to activate the LiF surface treatment. Both methods are discussed in detail below. Methods for preparing the base LMO are well known to those skilled in the art and will not be discussed herein.

In the dry blend method, a dry powdered LMO having particle sizes between about 3 microns to about 10 microns is blended with lithium fluoride having particle sizes between about 1 micron to about 5 microns. The amount of LiF added to the dry LMO powder may range from about 0.25% to about 2.5% by weight of the LMO powder initially charged to the blending unit. The type of blending unit is not critical to the current method. Suitable blending units include, but are not limited to, ball mills, vibratory mills, and Scott mills as well as any other convenient dry powder blending mill. Blending typically continues for a period sufficient to achieve a homogenous blend. In general, the step of dry blending continues for 20 to 60 minutes and the step of dry blending does not reduce the particle size of the selected starting material or the LiF. Typically, the step of heating the dry blend occurs under atmospheric conditions. Although some blending may occur during the heating process, preferably the powders are homogenously blended prior to the following heating step. Depending on the blending unit, typical blending times may range from about 15 minutes to about two hours with the total time dependent upon the quantity of materials and blending conditions. One skilled in the art will be able to readily adjust the blending conditions to achieve the desired homogenous blend of dry materials.

Following blending, the dry powder is heated. If so equipped, heating may occur within the mixing unit; however, typically the dry powder will be transferred to a rotary calciner. Within the rotary calciner, heating occurs with continued mixing of the powder. In general, the mixing occurring during heating precludes agglomeration and helps maintain even distribution of the particles. The dry powder is heated to a temperature sufficient to adhere the LiF to the surface of the LMO. Typically, the heating step takes place at a temperature sufficient to soften the LiF. As noted above, LiF is not a battery active material. Thus, the addition of too much LiF to the LMO will have a detrimental effect on the resulting cathode material. Therefore, properly controlling the heating of the blended powder will produce a LMO with the desired LiF surface treatment. As such, the heating range approximates the melting point of LiF under the operating conditions. Accordingly, heating generally occurs between 840° C. and 855° C. More commonly, heating occurs at about 850° C.

The heating step takes place over a period of about two to five hours. As discussed above, the heating step is controlled to limit the deposition of LiF on the surface of the LMO and preclude loss of lithium from the cathode active material structure during the heating step. Preferably, the heating step is limited to ensure the production of LMO with a surface treatment of LiF having maximum capacity with maximum protection against acid degradation. As such, heating may vary with operational conditions such as humidity, moisture content of the blended powder, as well as the mass of powder. In general, heating the blended powder will preferably take place over a period of about two to about four hours.

Without being limited by theory, the heating step is believed to fuse the LiF to the LMO. Regardless of the attachment mechanism, the resulting surface treatment of LiF provides a sufficient barrier to protect the LMO from acid degradation (i.e. acid attack) without substantially inhibiting necessary ion transport. The presence of the LiF on the surface of the LMO precludes reaction of HF or $F^-$ with the LMO thereby precluding loss of the manganese component of the LMO. Without intending to be limited by theory, we believe the LiF isolates a sufficient portion of the exposed manganese sites on the surface of LMO from the electrolyte thereby limiting the oxidation reaction known to degrade the LMO without interfering with the electrolytic reaction. Accordingly, a cathode prepared from the resulting LMO with surface treatment of LiF has reduced fade over a plurality of cycles while retaining substantially all the initial capacity of the LMO lacking the LiF surface treatment.

In an alternative embodiment, the LMO with surface treatment of LiF may be prepared by a solution process. In the solution process, a slurry of LiF is prepared in water and heated to a temperature between about 40° C. and 60° C. The final slurry has from about 0.1% to about 1.0% LiF by weight. The method then blends LMO into the slurry. Stirring of the blended slurry continues until the slurry is a homogenous dispersion of LiF and LMO. The solids are separated from the slurry by drying or other convenient method and subsequently heated to a temperature between about 600° C. and 850° C. The heating step continues for a period sufficient to provide a surface treatment of LiF on the LMO.

Both methods for preparing the treated LMO, the method will commonly include the further step of sifting or sieving the final product to isolate particles having the desired size. Final particle sizes may range from 3 µm to about 30 µm. Typically, final particles ranging from about 3 µm to about 10 µm are desired for formation of cathodes used in lithium ion batteries.

The present invention also provides an improved cathode material utilizing the LMO with surface treatment of LiF discussed above. Cathode material utilizing the LMO/LiF composition will have improved fade characteristics and an initial capacity comparable to the same LMO lacking the surface treatment of LiF. As reflected by FIGS. 2-5, the LMO/LiF composition actually provides both improved fade characteristics and improved capacity. As reflected in the FIGS. 3-6, cathodes prepared from LMO carrying surface treatment of LiF had significantly better capacity after 250 discharge/charge cycles thereby reflecting improved fade characteristics. Additionally, each sample of LMO/LiF had an initial capacity within 10% of the untreated LMO.

Figure 2:
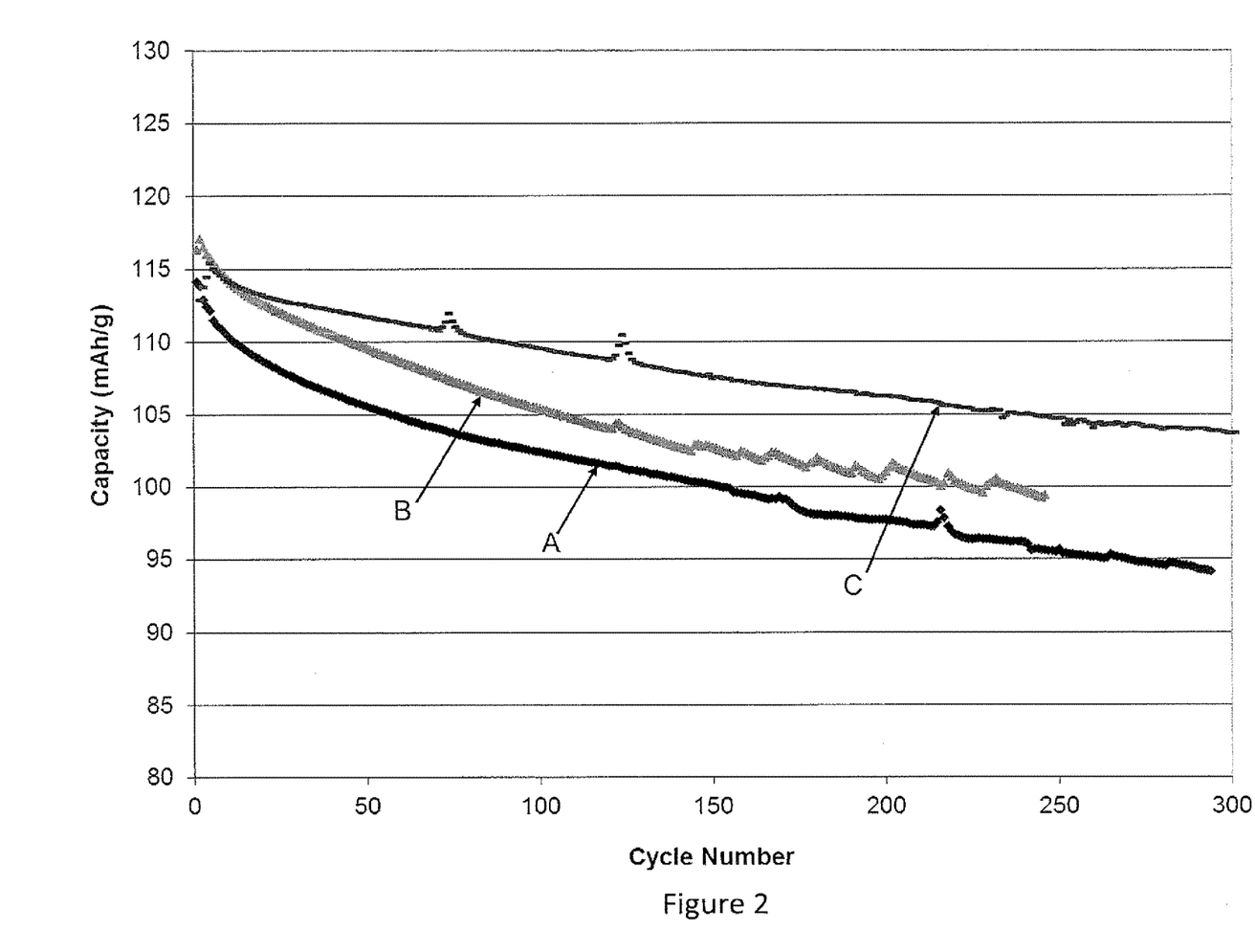
FIG. 2 is a graph of the cycling capacity at 60° C. comparing $Li_{1.06}Cr_{0.1}Mn_{1.84}O_4$ carrying a surface treatment of LiF heat treated in a rotary calciner at 850° C. with a residence time of 4-5 hours (Line C) to untreated $Li_{1.06}Cr_{0.1}Mn_{1.84}O_4$ (Line A) and to $Li_{1.06}Cr_{0.1}Mn_{1.84}O_4$, lacking LiF, but heat treated in a rotary calciner at 850° C. with a residence time of 4-5 hours (Line B). Each data point represents the discharge of the cathode to an indicated 3 volts over 60 minutes followed by recharging to an indicated 4.3 volts over 180 minutes.
Figure 3:
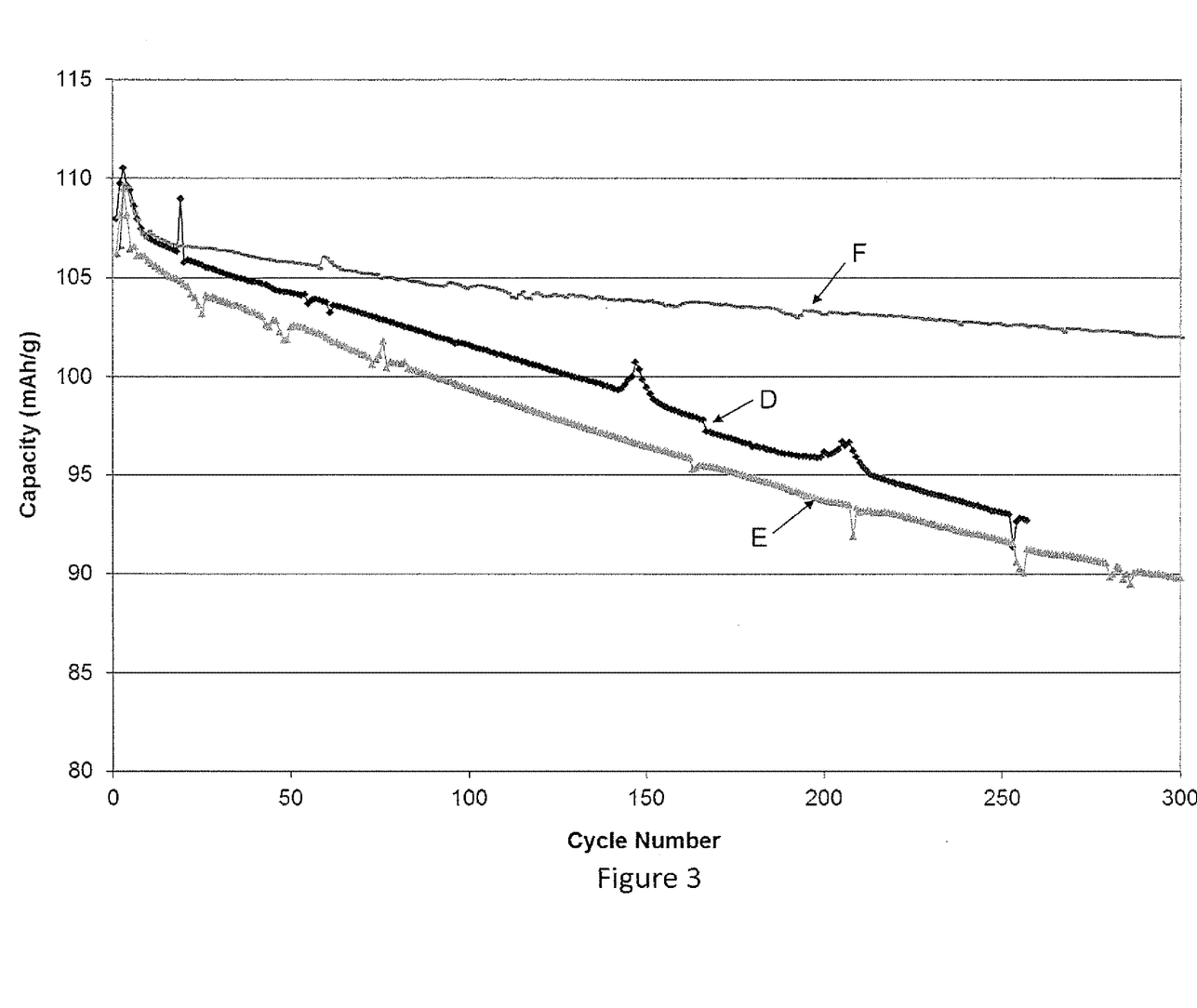
FIG. 3 is a graph of the cycling capacity at 60° C. comparing $Li_{1.06}Al_{0.18}Mn_{1.76}O_4$ carrying a surface treatment of LiF heat treated twice in a box oven at 850° C. (Line F) to untreated $Li_{1.06}Al_{0.1}Mn_{1.76}O_4$ (Line D) and to $Li_{1.06}Al_{0.18}Mn_{1.76}O_4$ carrying LiF but not heat treated (Line E). Each data point represents the discharge of the cathode to an indicated 3 volts over 60 minutes followed by recharging to an indicated 4.3 volts over 180 minutes.
Figure 4:
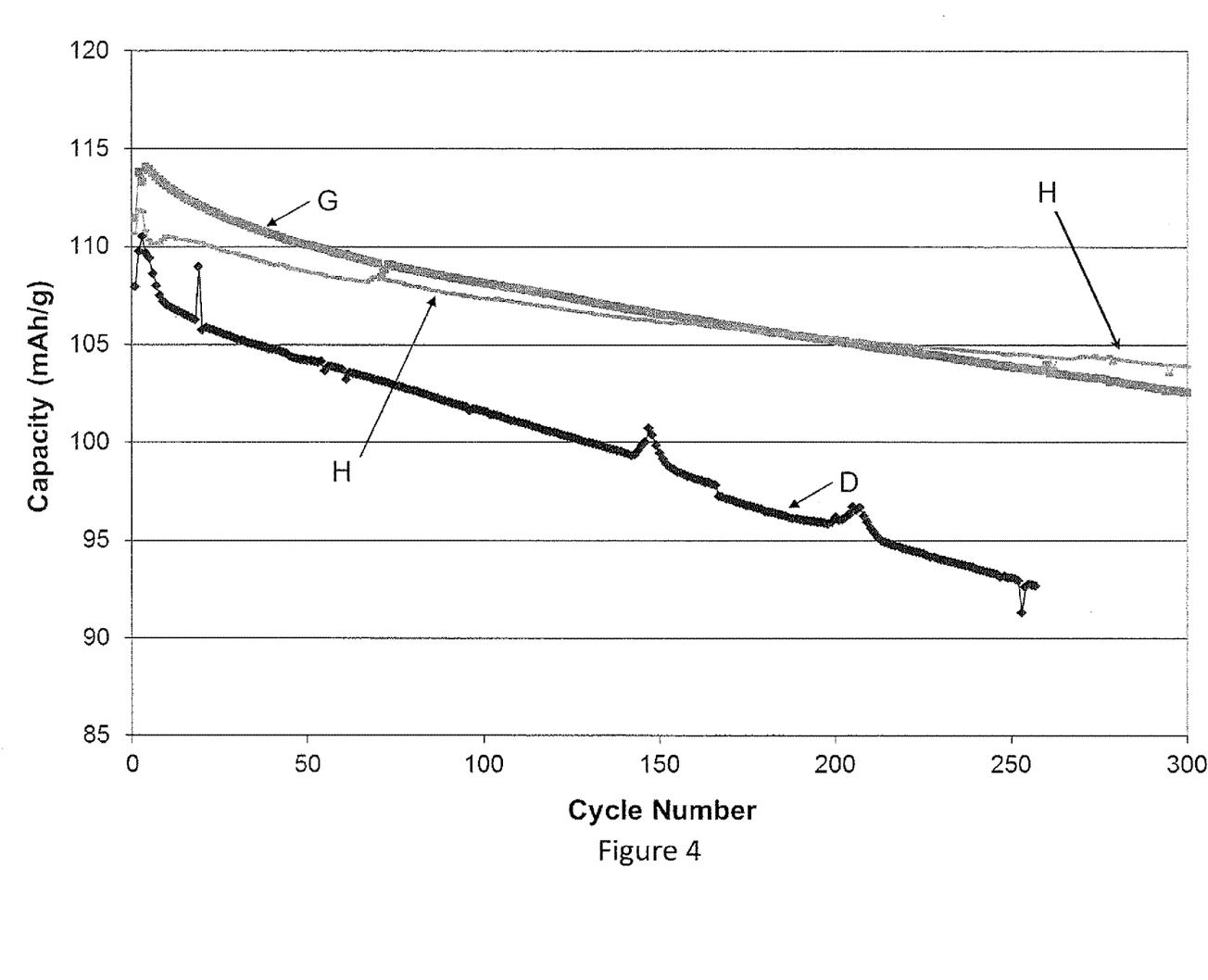
FIG. 4 is a graph of the cycling capacity at 60° C. comparing $Li_{1.06}Al_{0.18}Mn_{1.76}O_4$ carrying a surface treatment of LiF heat treated in a box oven at 850° C. (Line H) to untreated $Li_{1.06}Al_{0.18}Mn_{1.76}O_4$ (Line D) and to $Li_{1.06}Al_{0.18}Mn_{1.76}O_4$ lacking LiF but heat treated in a box oven at 850° C. (Line G). Each data point represents the discharge of the cathode to an indicated 3 volts over 60 minutes followed by recharging to an indicated 4.3 volts over 180 minutes.
Figure 5:
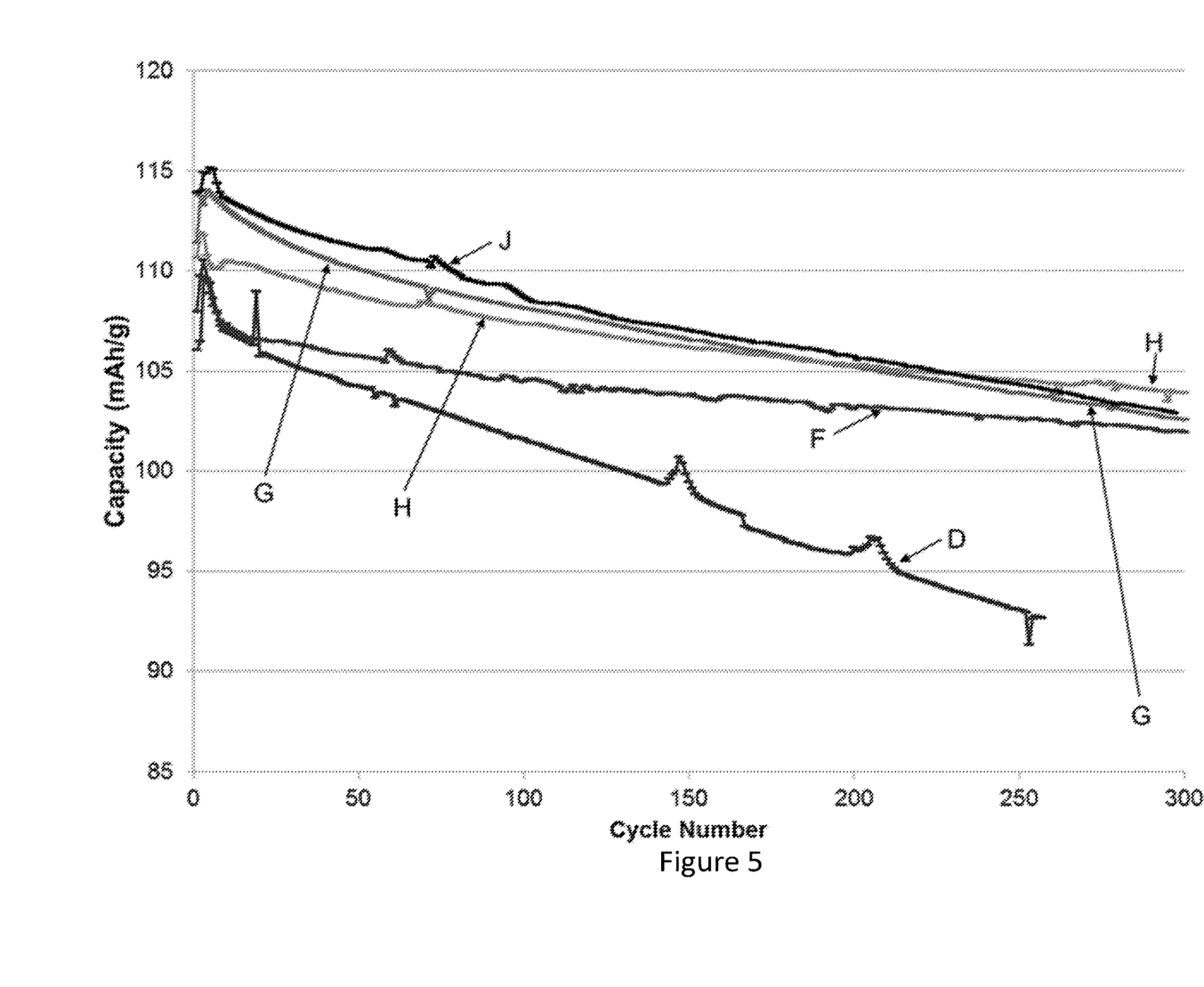
FIG. 5 is a graph of the cycling capacity at 60° C. comparing untreated $Li_{1.06}Al_{0.18}Mn_{1.76}O_4$ (Line D) to $Li_{1.06}Al_{0.18}Mn_{1.76}O_4$ free of LiF but heat treated in a box oven at 850° C. (Line G), to $Li_{1.06}Al_{0.18}Mn_{1.76}O_4$ free of LiF but heat treated twice in a box oven at 850° C. (Line J), to $Li_{1.06}Al_{0.18}Mn_{1.76}O_4$ carrying a surface treatment of LiF heat treated in a box oven at 850° C. (Line H) and to $Li_{1.06}Al_{0.18}Mn_{1.76}O_4$ carrying a surface treatment of LiF heat treated twice in a box oven at 850° C. (Line F). Each data point represents the discharge of the cathode to an indicated 3 volts over 60 minutes followed by recharging to an indicated 4.3 volts over 180 minutes.
Figure 6:
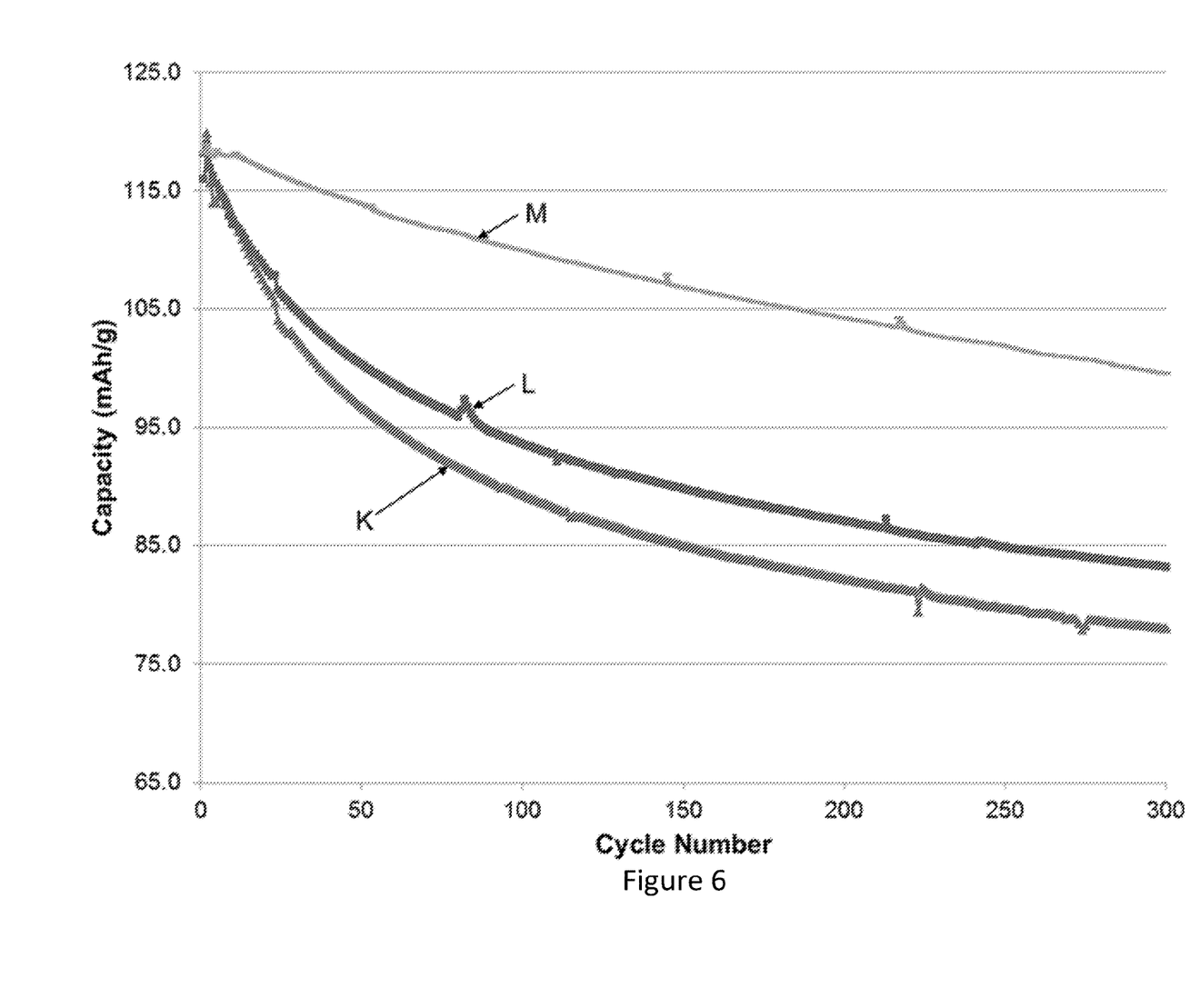
FIG. 6 is a graph demonstrating the ability to reduce the concentration of doping metal (Cr) while retaining the original cathode active material structure and improving cathode material capacity by treating with LiF and heat treating the material. Each data point represents the discharge of the cathode to an indicated 3 volts over 60 minutes followed by recharging to an indicated 4.3 volts over 180 minutes.

The LiF treated LMO was used to produce the cathodes incorporated into coin cell batteries for the purposes of determining capacity and fade rate of the cathodes. As reported in FIGS. 2-6 and Table 1 below, the LMO treated with LiF carried 1% by weight LiF. Except as indicated in Examples 6 and 7 below, each indicated heat treatment occurred at 850° C. for a period of 120 minutes in a box oven. (Note: although described in connection with a box oven, any conventional heating device suitable for heating the LMO carrying LiF for a period sufficient to activate the LiF will suffice.) Each sample, with or without a surface treatment of LiF, was prepared using the dry blending method described above. The FIGS. reflect the initial capacity of the active cathode material, i.e. the LiF treated LMO, in mAh/g and the capacity of the cathode following repeated charge and discharge cycles. All coin cell batteries were cycled at 1C discharge rate and C/3 charge rate at 60° C.

with each cell discharged to an indicated 3 volts over 60 minutes followed by recharging to an indicated 4.3 volts over 180 minutes. FIG. 2 depicts capacity testing results for cathodes prepared from untreated LMO (line A), LMO lacking LiF but heat treated once at 850° C. as described below in Example 6 (line B) and LMO carrying the LiF treatment and heat treated at 850° C. as described below in Example 7 (line C). In FIG. 3, line D reflects the capacity for a cathode prepared from LMO free of LiF. Line E reflects the capacity of a cathode prepared using LiF treated LMO but not heat treated. Line F reflects the capacity of a cathode prepared from LiF/LMO heat treated twice at 850° C. In FIG. 4, line D corresponds to line D of FIG. 3. Line G reflects the capacity of a cathode prepared from LMO free of LiF with a single heat treatment at 850° C. Line H reflects the capacity of cathode prepared from a LiF treated LMO heat treated once at 850° C. In FIG. 5, line D corresponds to Line D in FIGS. 3 and 4 and line F corresponds to line F in FIG. 3. Lines G and H correspond to lines G and H in FIG. 4. Line J reflects the capacity of a cathode prepared from LMO free of LiF but heat treated twice at 850° C. As reflected in FIG. 5, Line J has greater initial capacity than Lines F and H; however, Line J has a greater fade rate than Lines F and H. Although not wishing to be bound by theory, we believe that the double heat treatment of the LMO reduced the number of defects in the LMO leading to increased capacity. With reference to FIG. 6, Line K represents an LMO doped with 1.4 weight % Cr, but lacking LiF thereby providing a final LMO with the formula of ($Li_{1.05}Cr_{0.05}Mn_{1.9}O_4$). The line K material had an initial capacity of 118.2 mAh/g and a capacity of 78.0 mAh/g after 300 cycles. Line L represents an LMO doped with twice as much Cr (2.9 weight %), but lacking LiF thereby providing a final LMO with the formula of ($Li_{1.05}Cr_{0.1}Mn_{1.84}O_4$). The line L LMO had an initial capacity of 115.9 mAh/g and a capacity of 83.2 mAh/g after 300 cycles. Line M represents LMO with only 1.4 weight % Cr; however, the Line M LMO was treated with LiF and heat treated at 850° C. The Line M LMO is represented by ($Li_{1.05}Cr_{0.05}Mn_{1.9}O_4$). The Line M material had an initial capacity of 118.2 mAh/g and a capacity of 99.5 mAh/g after 300 cycles. As reflected in FIG. 6, the LiF treatment is even more effective at stabilizing the capacity of the LMO than additional dopant in the structure. Table 1 provides the individual cycle values in mAh/g for each sample depicted in FIGS. 2-5.

7 (line C) had an initial capacity of 112.9 mAh/g. After cycling 246 times, the line C sample had a final capacity value of 104.9 mAh/g. In contrast, the untreated LMO (line A) had an initial capacity 114.1 mAh/g. Following cycling 246 times, the line A sample had a capacity value of 95.6 mAh/g. LMO free of LiF but heat treated once at 850° C. as described in Example 6 (line B) had an initial capacity of 116.4 mAh/g and a capacity of 99.4 mAh/g following 246 cycles.

With reference to FIGS. 3-6, LMO treated with LiF and heat treated once at 850° C. (line H) had an initial capacity of 110.7 mAh/g and a capacity of 104.5 mAh/g after 250 cycles. The sample represented by line H had a capacity of 103.9 mAh/g after 300 cycles. LMO treated with LiF and heat treated twice at 850° C. (line F) had an initial capacity of 106.1 mAh/g and a capacity of 102.0 mAh/g after 300 cycles. Line D, reflecting untreated LMO, indicates an initial capacity of 108.0 mAh/g and a capacity of 93.1 mAh/g after 250 cycles. Line E, reflecting LMO treated with LiF but not heat treated, indicates an initial capacity of 106.2 mAh/g, a capacity of 91.7 mAh/g following 250 cycles and a capacity of 89.8 mAh/g following 300 cycles. Line G, reflecting LMO lacking LiF but heat treated once at 850° C., indicates an initial capacity of 111.4 mAh/g, a capacity of 103.9 mAh/g following 250 cycles and a capacity of 102.6 mAh/g following 300 cycles. Line J, reflecting LMO lacking LiF but heat treated twice at 850° C., indicates an initial capacity of 113.9 mAh/g, a capacity of 104.3 mAh/g following 250 cycles and a capacity of 102.9 mAh/g following 300 cycles. Each Line in FIGS. 2-6 represents capacity values for the cathode material used in the coin cell batteries prepared as described in the following examples. The coin cell batteries were cycled at 1C discharge rate and C/3 charge rate at 60° C.

Example 1

A spinel material with a nominal composition of $Li_{1.06}Al_{0.18}Mn_{1.76}O_4$ was prepared as follows. 216.0 g of $Mn_2O_3$, 59.62 g of $Li_2CO_3$ and 14.036 g of $Al_2O_3$ were mixed together and the mixture was then ball milled for 2 hours (enough to thoroughly mix the materials but not decrease particle size). This mixture was then heated in a ceramic dish in a box furnace at 850° C. for 10 hours. (This ten-hour heat treatment forms the initial LMO material. Application of the LiF surface treatment generally includes an additional heat treatment step.) Following the ten-hour

TABLE 1

Lines C, E, F, H and M include LiF Surface Treatments

| Material | Formula not including LiF treatments | Heat Treatments 120 minutes at 850° C. | Initial Capacity (mAh/g) | Maximum capacity (mAh/g) | Fade rate after 300 cycles (%/cycle) at 60° C. |
|---|---|---|---|---|---|
| A | $Li_{1.06}Cr_{0.1}Mn_{1.84}O_4$ | 0 | 114.1 | 114.1 | −0.052 |
| B | $Li_{1.06}Cr_{0.1}Mn_{1.84}O_4$ | 1 | 116.4 | 117.1 | −0.058 (cycle 246) |
| C | $Li_{1.06}Cr_{0.1}Mn_{1.84}O_4$ | 1 | 112.9 | 115.4 | −0.033 |
| D | $Li_{1.06}Al_{0.18}Mn_{1.76}O_4$ | 0 | 108 | 110.5 | −0.055 |
| E | $Li_{1.06}Al_{0.18}Mn_{1.74}O_4$ | 0 | 106.2 | 109.5 | −0.057 |
| F | $Li_{1.06}Al_{0.18}Mn_{1.76}O_4$ | 2 | 106.1 | 109.7 | −0.016 |
| G | $Li_{1.06}Al_{0.18}Mn_{1.76}O_4$ | 1 | 111.4 | 114.0 | −0.031 |
| H | $Li_{1.06}Al_{0.18}Mn_{1.76}O_4$ | 1 | 110.7 | 111.9 | −0.021 |
| J | $Li_{1.6}Al_{0.18}Mn_{1.76}O_4$ | 2 | 113.9 | 115.1 | −0.033 |
| K | $Li_{1.5}Cr_{0.05}Mn_{1.9}O_4$ | 0 | 118.2 | 119.9 | −0.109 |
| L | $Li_{1.05}Cr_{0.1}Mn_{1.85}O_4$ | 0 | 115.9 | 118.9 | −0.093 |
| M | $Li_{1.05}Cr_{0.05}Mn_{1.9}O_4$ | 1 | 118.2 | 118.9 | −0.056 |

With reference to FIG. 2 and Table 1, the LMO treated with LiF and heat treated at 850° C. as described in Example heat treatment to prepare LMO, the temperature was decreased from 850° C. to room temperature at a rate of 2° C./min. The resulting conventional LMO product was then passed through a −325 mesh screen.

Example 2

A lithium coin cell battery was made with a cathode disk containing 30 percent by weight of carbon black as a conductivity aid, 5 percent by weight of polyvinylidene fluoride (PVDF) as a binder and 65 percent by weight of the cathode active material from Example 1, a Li foil anode and an electrolyte comprised of 1M LiPF6 dissolved in a mixture of equal parts by weight of ethylene carbonate and dimethylcarbonate. The coin cell battery was cycled at 1C discharge rate and C/3 charge rate at 60° C. Line D in FIG. 3 represent the capacity values of the cathode material prepared from the conventional non-heat treated LMO material prepared in Example 1 and incorporated into the cathode of a coin cell battery prepared in Example 2.

Example 3

To demonstrate the effect of an additional heat treatment on conventional LMO, about 50 g of $Li_{1.06}Al_{0.18}Mn_{1.76}O_4$ from Example 1 was heated in a ceramic dish in a box furnace at 850° C. for 2 hours. The temperature was decreased from 850° C. to room temperature at a rate of 2° C./min. This material was passed through a −325 mesh screen and then tested in a lithium coin cell battery as prepared in Example 2. Line G in FIG. 4 represents the capacity values for a cathode material prepared from the heat treated conventional LMO.

Example 4

To demonstrate the effect of LiF treatment in conjunction with two heat treatment steps, 201.4 g of $Li_{1.06}Al_{0.18}Mn_{1.76}O_4$ from Example 1 was mixed with 2.0 g of LiF (1% by weight) and ball milled for 2 hours. 20 g of this mixture was heated at 850° C. for 2 hours in a ceramic crucible placed in a box furnace. Once cooled, the powder was hand mixed with a mortar and pestle to ensure homogeneity and reheated again at 850° C. for an additional 2 hours. The temperature of the box furnace was decreased to room temperature at a rate of 2° C./min. This material was passed through a −325 mesh screen and then tested in a lithium coin cell battery as prepared in Example 2. Line F in FIG. 3 represents the capacity values of cathode material prepared from the LiF treated LMO. FIG. 3 clearly demonstrates the improvement provided to the coin cell by using a cathode incorporating LMO having a surface treatment of LiF and prepared using two heat treatments over the heat treated conventional LMO and the non-heat treated conventional LMO.

Example 5

A conventional LMO was prepared using a spinel material with a nominal composition of $Li_{1.06}Cr_{0.1}Mn_{1.84}O_4$ was prepared as follows. 37.784 kg of $Mn_2O_3$, 2.017 kg $Cr_2O_3$ and 10.185 kg of $Li_2CO_3$ were placed in a vibratory mill and mixed with ceramic media for 45 minutes. This step was repeated until about 700 kg of spinel premix was obtained. The premix was then reacted in a rotary calciner with temperature settings of 850° C. in all heating zones. An oxygen rich atmosphere was flowing through the calciner during the first pass through. Subsequent passes were achieved with normal air flow through the calciner. The material was repeatedly passed through the calciner until a total residence time of 10 hours at 850° C. was attained. The material was then passed through the calciner one more time, with the temperature decreasing through the heating zones. This allowed for a slow cool rate of about 1.5° C./min down to 600° C. The cooled product was passed through a −325 mesh screen and then tested in a lithium coin cell battery as prepared in Example 2. Line A in FIG. 2 represents the capacity values for cathode material prepared from the non-heat treated, LiF free LMO.

Example 6

To demonstrate the effect of a heat treatment on the LMO of Example 5, approximately 25 kg of $Li_{1.06}Cr_{0.1}Mn_{1.84}O_4$ prepared in Example 5 was passed through a rotary calciner at 850° C. at a rate sufficient to achieve a 4-5 hour residence time. The material was then passed through a rotary calciner a second time with the temperatures in the heating zones decreasing to achieve about a slow cool rate of about 1.5° C./min down to 600° C. The cooled product was passed through a −325 mesh screen and then tested in a lithium coin cell battery as prepared in Example 2. Line B in FIG. 2 represents the capacity values for a cathode material prepared from the heat treated conventional LMO.

Example 7

To demonstrate the effect of LiF treatment and a single heat treatment step, 4.4 kg of $Li_{1.06}Cr_{0.1}Mn_{1.84}O_4$ prepared in Example 5 was combined with 44 g of LiF. This mixture was placed in a vibratory mill and mixed with ceramic media for 45 minutes. This step was repeated until about 70 kg of LiF treated spinel premix was obtained. This material was passed through a rotary calciner at 850° C. at a rate sufficient to achieve a 4-5 hour residence time. The material was then passed through a rotary calciner a second time with the temperatures in the heating zones decreasing to achieve about a slow cool rate of about 1.5° C./min down to 600° C. The cooled product was passed through a −325 mesh screen and then tested in a lithium coin cell battery as prepared in Example 2. Line C in FIG. 2 represents the capacity values for a cathode material prepared from the heat treated, LiF treated LMO. FIG. 2 clearly demonstrates the improvement provided to the coin cell by using a cathode incorporating the LMO carrying a surface treatment of LiF prepared using a single heat treatment step over the heat treated conventional LMO and the non-heat treated conventional LMO.

Coin cell batteries using cathodes incorporating LMO corresponding to Materials E, H, J, K, L and M from Table 1 were also prepared according to the above procedures with the heat treatments and LiF surface treatments as identified in Table 1. Cathode material capacity values for each coin cell battery are reported as the corresponding lines E, H, J, K, L and M in FIGS. 3-6. Thus, FIGS. 2-6 demonstrate that the utilization of a cathode prepared from LMO having a surface treatment of LiF provides an improved secondary battery.

Other embodiments of the present invention will be apparent to one skilled in the art. As such, the foregoing description merely enables and describes the general uses and methods of the present invention. Accordingly, the following claims define the true scope of the present invention.

What is claimed is:

1. A method for preparing cathode active material comprising:
selecting a cathode active starting material from the group consisting of $Li_{1+x}M_yMn_{2-x-y}O_4$ where $0<x<0.25$, $0<y<0.5$ and M is one or more trivalent metals from the group Al, Cr, Ga, In and Sc and $Li[Li_{(1-2x)/3}M_yMn_{(2-x)/3}Ni_{x,y}]O_2$ where $0<x<0.5$, $0<y<0.25$, $x>y$ and M is one or more metals chosen from Ca, Cu, Mg and Zn;
dry blending LiF particles with the selected starting material, wherein the resulting dry blend comprises from 0.25 to 2.5% by weight LiF;
heating the resulting dry blend at a temperature between about 700° C. and 850° C. for a period of about two hours to about six hours to activate the LiF and to provide a final composition in the form of a cathode active material carrying a surface treatment of LiF on the surface of the cathode active material, said surface treatment of LiF in direct contact with said cathode active material.

2. A method for preparing cathode active material comprising:
selecting a starting material from the group consisting of $Li_{1+x}M_yMn_{2-x-y}O_4$ where $0<x<0.25$, $0<y<0.5$ and M is one or more trivalent metals from the group Al, Cr, Ga, In and Sc and $Li[Li_{(1-2x)/3}M_yMn_{(2-x)/3}Ni_{x,y}]O_2$ where $0<x<0.5$, $0<y<0.25$, $x>y$ and M is one or more metals chosen from Ca, Cu, Mg and Zn;
dry blending LiF particles with the selected starting material, wherein the resulting dry blend comprises from 0.25 to 2.5% by weight LiF;
heating the resulting dry blend at a temperature between about 700° C. and 850° C. for a period of about two hours to about six hours to provide a final composition in the form of a cathode active material carrying a surface treatment of LiF on the surface of the cathode active material, said surface treatment of LiF in direct contact with said cathode active material.

3. A method for preparing a cathode material comprising:
selecting a starting material from the group consisting of a cathode active material having the general formula of $Li_{1+x}M_yMn_{2-x-y}O_4$ where $0<x<0.25$, $0<y<0.5$ and M is one or more trivalent metals from the group Al, Cr, Ga, In and Sc or $Li[Li_{(1-2x)/3}M_yMn_{(2-x)/3}Ni_{x,y}]O_2$ where $0<x<0.5$, $0<y<0.25$, $x>y$ and M is one or more metals chosen from Ca, Cu, Mg and Zn;
dry blending LiF particles with the selected starting material, wherein the resulting dry blend comprises from 0.25 to 2.5% by weight LiF;
heating the resulting dry blend at a temperature between about 700° C. and 850° C. for a period of about two hours to about six hours thereby yielding a final composition with a surface treatment of LiF in direct contact with the surface of the composition; and,
preparing a cathode material using the final composition with surface treatment of LiF wherein said cathode material has a capacity greater than 100 mAh/g after 200 cycles when cycled at 60° C. to a complete discharge to an indicated 3 volts over 60 minutes and recharged to an indicated 4.3 volts over 180 minutes.

4. The method of claim 1, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

5. The method of claim 1, wherein the step of dry blending occurs at a temperature between about 10° C. to about 30° C.

6. The method of claim 1, wherein the step of dry blending continues until the LiF is homogenously distributed.

7. The method of claim 6, wherein the step of dry blending continues for 20 to 60 minutes and the step of dry blending does not reduce the particle size of the selected starting material or the LiF.

8. The method of claim 1, wherein the step of heating the dry blend occurs under atmospheric conditions.

9. The method of claim 1, wherein the resulting final composition has a particle size between about 3 µm to about 30 µm.

10. The method of claim 1, wherein the resulting final composition comprises from about 0.25 to 2.5% by weight LiF.

11. A method for preparing cathode active material comprising:
selecting a starting material from the group consisting of a cathode active material having the general formula of $Li_{1+x}M_yMn_{2-x-y}O_4$ where $0<x<0.25$, $0<y<0.5$ and M is one or more trivalent metals from the group Al, Cr, Ga, In and Sc or $Li[Li_{(1-2x)/3}M_yMn_{(2-x)/3}Ni_{x,y}]O_2$ where $0<x<0.5$, $0<y<0.25$, $x>y$ and M is one or more metals chosen from Ca, Cu, Mg and Zn;
preparing a slurry of LiF particles in water;
heating the slurry to a temperature between about 40° C. and 60° C.;
blending the selected starting material into the slurry;
stirring the slurry of LiF and starting material until the slurry is a homogeneous dispersion of LiF and starting material;
drying the slurry to isolate the solids;
heating the resulting solids at a temperature between about 450° and 850° for a period sufficient to activate the LiF and to provide a final composition in the form of a cathode active material carrying a surface treatment of LiF in direct contact with the surface of the cathode active material.

12. The method of claim 11, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

13. The method of claim 11, wherein the resulting cathode material has a particle size between about 3 µm to about 30 µm.

14. The method of claim 11, wherein the resulting cathode material comprises from about 0.25 to 2.5% by weight LiF.

15. The method of claim 11, further comprising the step of forming a cathode material wherein said cathode material has a capacity greater than 100 mAh/g after 200 cycles when cycled at 60° C. to a complete discharge to an indicated 3 volts over 60 minutes and recharged to an indicated 4.3 volts over 180 minutes.

16. The method of claim 11, further comprising the step of drying the solids removed from said slurry, said drying step taking place at a temperature between about 50° C. and 140° C.

17. A composition comprising:
a cathode active material having the general formula of $Li_{1+x}M_yMn_{2-x-y}O_4$ where $0<x<0.25$, $0<y<0.5$ and M is one or more trivalent metals from the group Al, Cr, Ga, In and Sc or $Li[Li_{(1-2x)/3}M_yMn_{(2-x)/3}Ni_{x,y}]O_2$ where $0<x<0.5$, $0<y<0.25$, $x>y$ and M is one or more metals chosen from Ca, Cu, Mg and Zn;
a surface treatment of LiF carried on the surface of said cathode active material and in direct contact with said surface of said cathode active material wherein said cathode composition has x-ray diffraction peaks at 38.6, 44.84, and 65.46.

18. The method of claim 11, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

19. The composition of claim 17, wherein said composition is substantially free of $Mn_2O_3$.

20. The cathode composition of claim 17, wherein from 0.25 to 2.5 percent by weight of said cathode composition is LiF.

21. The cathode composition of claim 17, wherein the resulting cathode composition has a median particle size between about 3 μm and about 30 μm.

22. A cathode composition comprising:
 a cathode active material having the general formula of $Li_{1+x}M_yMn_{2-x-y}O_4$ where $0<x<0.25$, $0<y<0.5$ and M is one or more trivalent metals from the group Al, Cr, Ga, In and Sc or $Li[Li_{(1-2x)/3}M_yMn_{(2-x)/3}Ni_{x-y}]O_2$ where $0<x<0.5$, $0<y<0.25$, $x>y$ and M is one or more metals chosen from Ca, Cu, Mg and Zn;
 a surface treatment of LiF on the surface of said cathode active material and in direct contact with the surface of said cathode active material; and,
 wherein said cathode composition has a capacity greater than 100 mAh/g after 200 cycles.

23. The method of claim 22, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

24. The cathode composition of claim 22, wherein said cathode composition comprises from about 0.25% to about 2.5% LiF by weight.

25. The cathode composition of claim 22 further comprising from about 0.1% to about 15% by weight of a doping metal.

26. The cathode composition of claim 25, wherein said doping metal is selected from the group consisting of: Mg, Al, Cr, Fe, Ni, Co, Ga, In, Sc, In, Cu or Zn.

27. The method of claim 2, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

28. The method of claim 2, wherein the step of dry blending occurs at a temperature between about 10° C. to about 30° C.

29. The method of claim 2, wherein the step of dry blending continues until the LiF is homogenously distributed.

30. The method of claim 2, wherein the step of dry blending continues for 20 to 60 minutes and the step of dry blending does not reduce the particle size of the selected starting material or the LiF.

31. The method of claim 2, wherein the step of heating the dry blend occurs under atmospheric conditions.

32. The method of claim 2, wherein the resulting final composition has a particle size between about 3 μm to about 30 μm.

33. The method of claim 2, wherein the resulting final composition comprises from about 0.25 to 2.5% by weight LiF.

34. The method of claim 3, wherein the starting material is selected from the group consisting of: $Li_{1.06}Al_{0.18}Mn_{1.76}O_4$, $Li_{1.06}Cr_{0.1}Mn_{1.84}O_4$, and $Li_{1.05}Al_{0.12}Mn_{1.83}O_4$.

35. The method of claim 3, wherein the step of dry blending occurs at a temperature between about 10° C. to about 30° C.

36. The method of claim 3, wherein the step of dry blending continues until the LiF is homogenously distributed.

37. The method of claim 3, wherein the step of dry blending continues for 20 to 60 minutes and the step of dry blending does not reduce the particle size of the selected starting material or the LiF.

38. The method of claim 3, wherein the step of heating the dry blend occurs under atmospheric conditions.

39. The method of claim 3, wherein the resulting final composition has a particle size between about 3 μm to about 30 μm.

40. The method of claim 3, wherein the resulting final composition comprises from about 0.25 to 2.5% by weight LiF.

* * * * *

UNITED STATES PATENT AND TRADEMARK OFFICE
CERTIFICATE OF CORRECTION

PATENT NO. : 10,522,822 B2  
APPLICATION NO. : 14/762148  
DATED : December 31, 2019  
INVENTOR(S) : Phillip M. Story et al.

Page 1 of 1

It is certified that error appears in the above-identified patent and that said Letters Patent is hereby corrected as shown below:

In the Specification

Column 3, Line 12, delete "0.1" and insert --0.18-- therefor;

Column 4, Line 50, delete "1.4" and insert --1.84-- therefor;

Column 4, Line 51, delete "1.06" and insert --1.05-- therefor;

Column 7, Table 1, Line E, delete "1.74" and insert --1.76-- therefor;

Column 7, Table 1, Line J, delete "1.6" and insert --1.06-- therefor;

Column 7, Table 1, Line K, delete "1.5" and insert --1.05-- therefor;

Column 7, Table 1, Line L, delete "1.85" and insert --1.84-- therefor.

Signed and Sealed this  
Twenty-eighth Day of July, 2020

Andrei Iancu  
*Director of the United States Patent and Trademark Office*